United States Patent

Seng et al.

[11] 3,984,554
[45] Oct. 5, 1976

[54] ANIMAL FODDER COMPOSITIONS CONTAINING A 4-AMINO-PYRIMIDO-(4,5,b)-QUINOXALINE-5,10-DIOXIDE AND METHOD OF USING SAME

[75] Inventors: Florin Seng, Cologne; Kurt Ley, Odenthal-Gloebusch; Karl Georg Metzger, Wuppertal-Elberfeld, all of Germany

[73] Assignee: Bayer Aktiengesellschaft, Germany

[22] Filed: Feb. 3, 1975

[21] Appl. No.: 546,403

Related U.S. Application Data

[60] Division of Ser. No. 511,175, Oct. 2, 1974, which is a continuation-in-part of Ser. No. 362,300, May 21, 1973, which is a division of Ser. No. 160,542, July 7, 1971, Pat. No. 3,793,323.

[30] Foreign Application Priority Data

July 11, 1970 Germany.............................. 2034476

[52] U.S. Cl. .............................................. 424/251
[51] Int. Cl.² ......................................... A61K 31/505
[58] Field of Search .................................... 424/251

[56] References Cited
UNITED STATES PATENTS

| | | | |
|---|---|---|---|
| 2,942,001 | 6/1960 | Druey et al. .................. | 260/250 A |
| 3,642,796 | 2/1972 | Serg et al. ..................... | 260/250 A |

*Primary Examiner*—Jerome D. Goldberg

[57] ABSTRACT

4-amino-pyrimido-(4,5,b)-quinoxaline-5,10-dioxides of the formula:

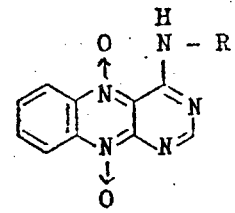

wherein
R is hydrogen, a straight or branched chain saturated or partially unsaturated substituted or unsubstituted aliphatic moiety or a substituted or unsubstituted cycloaliphatic moiety, are produced by reacting quinoxaline-di-N-oxide of the formula:

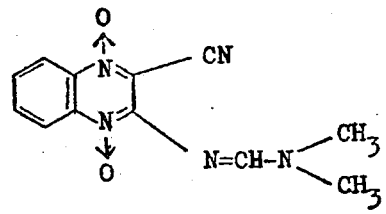

with an amine of the general formula R-NH₂, wherein R is as defined, above, in a diluent, at a temperature in the range of 20° to 100° C.

These compounds are useful for their antimicrobial activity. They exhibit activity against both gram positive and gram negative bacteria.

24 Claims, No Drawings

ANIMAL FODDER COMPOSITIONS CONTAINING A 4-AMINO-PYRIMIDO-(4,5,b)-QUINOXALINE-5,10-DIOXIDE AND METHOD OF USING SAME

This is a division of application Ser. No. 511,175 filed Oct. 2, 1974, which is a CIP of Ser. No. 362,300 filed May 21, 1973, which is a division of Ser. No. 160,542 filed July 7, 1971, which issued as U.S. Pat. No. 3,793,323 on Feb. 19, 1974.

The present invention is concerned with quinoxaline derivatives, a process for their production, their use as antimicrobial agents, compositions utilizing said compounds as an active ingredient and the use of said compounds to treat microbial infections.

More particularly, the present invention relates to 4-amino-pyrimido-(4,5,b)-quinoxaline-5,10-dioxides, which are unsubstituted or substituted in the 4-amino moiety. These compounds are useful in both human and veterinary medicine, and are also useful as fodder additives, especially in raising young animals and fatstock.

According to the present invention the 4-amino-pyrimido-(4,5,b)-quinoxaline-5,10-dioxides may be represented by the formula (I):

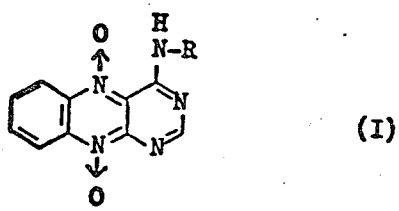

wherein

R is hydrogen, a straight or branched chain saturated or partially unsaturated, substiuted or unsubstituted aliphatic moiety or a substituted or unsubstituted cycloaliphatic moiety.

The compounds are produced by reacting quinoxaline-di-N-oxide of the formula (II):

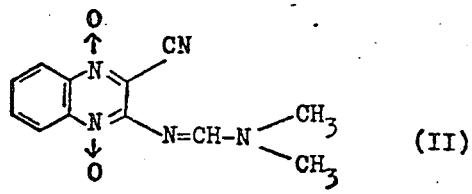

with an amine of the formula (III):

wherein R is as above defined, in a diluent, at a temperature range of from 20° to 100°C.

When R is an aliphatic moiety, it is preferably straight or branched chain alkyl of 1 to 6 carbon atoms, especially 1 to 4 carbon atoms or lower alkenyl of 2 to 6 carbon atoms, especially 2 to 4 carbon atoms.

When R is a cycloaliphatic moiety, it is preferably of 5 to 7 carbon atoms, especially 5 or 6 carbon atoms. Cycloalkyl of 5 to 7 carbons and particularly 5 or 6 carbon atoms is preferred.

When the aliphatic or cycloaliphatic moiety R is substituted, the preferred substituents are one or more, identical or different, preferably one, hydroxyl, alkoxy and/or dialkylamino moiety, wherein the alkoxy portion is of 1 to 4 carbon atoms and preferably 1 to 2 carbon atoms, and the dialkylamino moiety is of 1 to 4 carbon atoms, preferably 1 to 2 carbon atoms in each alkyl moiety.

Examples of R includes methyl, ethyl, n- and iso-propyl, n-, iso- and tert.-butyl, cyclohexyl, allyl, 2-hydroxyethyl, 2-methoxyethyl and 1-dimethylamino-propyl.

At least 1 mol of amine or ammonia (III) is employed per mol of quinoxaline-di-N-oxide (II) in the production of compounds (I), and if desired an excess of amine or ammonia can be used. Preferably 1 to 5, especially 1.5 to 3, mols of amine or ammonia (III) are used per mol of N-oxide (II).

As aliphatic amines (III) there may be used straight or branched chain alkylamines of 1 to 6 carbon atoms, preferably 1 to 4 carbon atoms, or alkenylamines of 2 to 6 carbon atoms, preferably 2 to 4 carbon atoms. The alkylamines and alkenylamines are unsubstituted or substituted by one or more, identical or different, preferably one, of the moieties set forth as substituents for the aliphatic and cycloaliphatic moieties above.

The cycloaliphatic amines (III) are of 5 to 7 carbon atoms, preferably 5 or 6 carbon atoms, and are unsubstituted or substituted by one or more, identical or different, preferably one, of the moieties set forth as substitutents for the aliphatic and cycloaliphatic moieties above.

Examples of compounds R - NH$_2$ (III) include: methylamine, ethylamine, n- and iso-propylamine, n-, iso- and tert.-butylamine, cyclohexylamine, allylamine, 2-hydroxyethylamine, 2-methoxyethylamine, 1-dimethylamino-propylamine and ammonia.

Ammonia and the other amines (III) can, where convenient or desired, be employed in the gaseous form, but can also be employed in the form of their aqueous solutions.

The preferred temperature range for the reaction between the compounds (II) and (III) is 40° to 70°C.

Suitable diluents or solvents for the reaction are inert organic solvents, especially polar organic solvents, such as, for example, formamide, dimethylformamide and N-methyl-pyrolidone; lower aliphatic alcohols with, preferably 1 to 4 carbon atoms, such as, for example, methanol, ethanol, propanol, isopropanol and n-, iso- and tert.-butanol; lower alkylnitriles, such as, for example, acetonitrile; ethers, such as, for example, dioxane and tetrahydrofuran; and pyridine.

The following reaction scheme, showing the use of methylamine as amine (III), illustrates the reaction according to the invention:

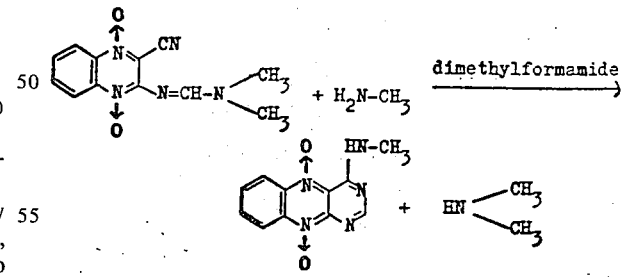

In detail, the reaction according to the invention may be carried out as follows The quinoxaline-di-N-oxide (II) is suspended in one of the abovementioned diluents and is treated with at least the equivalent quantity of a primary amine or ammonia (III). After warming the mixture to between about 20° and about 100°C, the reaction is complete after about 1 to 5 hours. The reaction product separates out as crystals and may be isolated according to customary methods.

The reaction according to the invention produces, smoothly and in good yields, compounds of the formula (I).

The following examples more particularly illustrate the production of the new compounds according to the present invention.

EXAMPLE 1

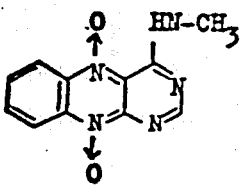

25.7 g. (0.1 mol) of quinoxaline-di-N-oxide (II) are suspended in 80 ml. of dimethylformamide, 17.7 g. (0.2 mol) of 35% strength aqueous methylamine solution are added, and the mixture is warmed to about 50°C. After about one hour it is cooled and the product filtered off. 18 g. (74% of theory) of 4-methylamino-pyrimido-(4,5,b)-quinoxaline-5,10-dioxide are obtained in the form of red crystals which, after recrystallisation from dimethylformamide, melt at 189°C, with decomposition.

Analysis $C_{11}H_9N_5O_2$ (243): Calculated: C 54.3%; H 3.7%; N 28.8%; Found: C 54.1%; H 3.9%; N 28.9%

The following compounds are prepared by methods analogous to that described above by reacting the quinoxaline-di-N-oxide (II) with the amine listed above.

Examples 2 – 8

| Formula | Amine used | Reaction time (hours) | Reaction temperature (0°C) | Mp. (0°C) | Yield(% of theory) |
|---|---|---|---|---|---|
| 2) | Ethylamine | 1 | 50 | 170 | 77 |
| 3) | Propylamine | 5 | 50 | 166 (decomposition) | 64 |
| 4) | Isopropylamine | 4 | 50 | 172 (decomposition) | 74 |
| 5) | n-Butylamine | 3 | 60 | 174 (decomposition) | 68 |
| 6) | Cyclohexylamine | 3 | 60 | 180 (decomposition) | 59 |

-continued

| Formula | Amine used | Reaction time (hours) | Reaction temperature (0°C) | Mp. (0°C) | Yield(% of theory) |
|---|---|---|---|---|---|
| 7) (structure with HN—CH₂—CH₂—OH) | Ethanolamine | 1 | 70 | 174 (decomposition) | 64 |
| 8) (structure with NH₂) | Ammonia | 8 | 60 | >300 | 88 |

The di-N-oxide (II) used as starting material is obtained from 2-amino-3-cyano-quinoxaline-di-N-oxide and dimethylformamide in the presence of phosphorus oxychloride, in the following manner.

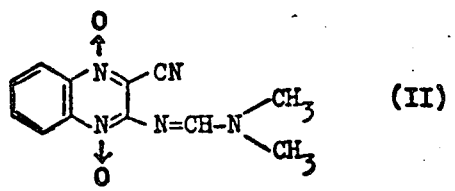

20.2 g. (0.1 mol) of 2-amino-3-cyanoquinoxaline-di-N-oxide (K. Ley, F. Seng, H. Eholzer, R. Nast and R. Schubart, Angew. Chemie 81, 569 (1969)) are suspended in 100 ml of dimethylformamide, and 15.3 g. (0.1 mol) of phosphorus oxychloride are added dropwise while stirring and cooling in ice. After the dropwise addition, the mixture is stirred for a further hour and the precipitate is the filtered off. 23 g. (90% of theory) of the compound (II) are obtained in the form of red crystals, which after recrystallisation from pyridine melt at 231°C, with decomposition.

Analysis $C_{12}H_{11}N_5O_2$ (molecular weight 257): Calculated: C 56.0%; H 4.3%; N 27.3%; Found: C 56.0%; H 4.5%; N 27.6%

The compounds according to the invention are effective against Gram-negative and Gram-positive bacteria. Favorable inhibition values are obtained in the plate test (Table 1) against staphylococci and streptococci which are Gram-positive bacteria, and against enterobacteria (for example Escherichia coli, Proteus and Klebsiella) which are Gram-negative bacteria.

Table 1

Minimum inhibitory concentration (MIC) in the plate test: The medium used had the following composition

| Protease peptone | 10 | g |
|---|---|---|
| Veal extract | 10 | g |
| Dextrose | 2 | g |
| NaCl | 3.0 | g |
| Disodium phosphate | 2.0 | g |
| Sodium acetate | 1.0 | g |
| Adenine sulphate | 0.01 | g |
| Guanine hydrochloride | 0.01 | g |
| Uracil | 0.01 | g |
| Xanthin | 0.01 | g |
| Ionagar | 12.0 | g |
| 1000 ml of distilled water | | |
| pH value of the medium: | 7.4 | |

Table 1-continued

Minimum inhibitory concentrations in γ/ml

| Bacteria | Compound from Example | | | | | | |
|---|---|---|---|---|---|---|---|
| | 7 | 3 | 5 | 2 | 1 | 6 | 4 |
| Escherichia coli A 261 | 100 | 100 | — | 20 | 5 | — | 100 |
| Escherichia coli C 165 | 100 | 100 | — | 160 | 5 | — | 100 |
| Proteus vulgaris | 100 | 100 | — | 10 | 5 | — | 100 |
| Pseudomonas aeruginosa Bonn | 100 | 150 | — | 150 | 50 | — | 150 |
| Klebsiella 8085 | 150 | 100 | — | 10 | 5 | — | — |
| Staphylococcus aureus 133 | 100 | 10 | 10 | 5 | 2.5 | 10 | 10 |
| Streptococcus pyogenes W | 10 | 20 | 20 | 20 | 20 | — | 20 |

When used in the treatment of bacterial infections, the compounds can be employed per se or as the active agent in pharmaceutical compositions, such as, for example, ointments, creams, pastes, powders, lotions, solutions, emulsions and suspensions.

Suitable pharmaceutical compositions are produced by combining the active agent with a pharmaceutically acceptable, non-toxic, inert, solid, semi-solid or liquid excipient, carrier or solvent, such as, for example paraffins, vegetable fats and oils (for example groundnut and sesame oil), alcohols (for example ethyl alcohol and glycerol), glycols (for example propylene glycol and polyethylene glycol), emulsifiers (for example nonionic and anionic emulsifiers, such as polyoxyethylene-fatty acid-esters, polyoxyethylene-fatty alcohol-ethers, alkylsulphonates and arylsulphonates), natural and synthetic rock powders (for example kaoline, talc, chalk, highly dispersed silica or silicates), sugars (for example lactose and glucose). These formulations are produced according to techniques per se known.

The therapeutically active compounds are preferably present in the compositions in a concentration of about 0.5 to about 90 per cent by weight of the total composition. The concentration of the active agent, the nature of the excipient carrier or solvent and the frequency of administration are chosen in accordance with the type and severity of the illness, as is customary particularly in the treatment of local inflammations.

The amount of active compound utilized is within the same general range as known quinoxaline-di-N-oxides.

The mode of administration is the same, i.e. oral or parenteral. See for example U.S. Pat. Nos. 3,609,151; 3,682,906, 3,686,400; and 3,801,711. Best results are usually obtained by oral or parenteral administration of 1–100 mg/kg per day especially 5–50 mg/kg per day.

Furthermore, the compounds according to the present invention can be used for disinfection purposes.

The new compounds according to the present invention are particularly suitable for use as fodder additives, for example in raising young animals and fatstock, such as chicks, cattle and pigs. Their addition to the fodder leads to better utilization of the fodder and hence to more rapid growth and more rapid increase in weight of the animals. When added to the fodder, the new compounds also prevent bacterial infections of the animals. Best results are usually obtained by using 5–200 ppm of active compound per part of fodder, and especially 10–50 ppm.

The good effectiveness of the compounds according to the invention as fodder additives can be seen from the chick fattening experiment described below (Table 2).

Chick Fattening Experiment

The substances, ground with the fodder, were fed to one-day old chicks. The feeding lasted for seven weeks. Table 2 below gives the experimental data for the compound obtainable according to Example 2, for each of the 7 weeks.

Table 2

| Compound from example Amount used in ppm | Week | Number of Animals | Total weight increase (in g) | Ratio of total weight increase/ control, (in %) |
|---|---|---|---|---|
| Control 0 ppm | 0 | 50 | 40* | 100.0 |
| | 1 | 50 | 84 | 100.0 |
| | 2 | 50 | 248 | 100.0 |
| | 3 | 50 | 429 | 100.0 |
| | 4 | 50 | 607 | 100.0 |
| | 5 | 50 | 922 | 100.0 |
| | 6 | 50 | 1250 | 100.0 |
| | 7 | 50 | 1479 | 100.0 |
| Example 2 20 ppm | 0 | 50 | 41* | — |
| | 1 | 50 | 92 | 109.5 |
| | 2 | 50 | 262 | 105.6 |
| | 3 | 50 | 466 | 108.6 |
| | 4 | 50 | 678 | 111.7 |
| | 5 | 50 | 993 | 107.7 |
| | 6 | 50 | 1310 | 104.8 |
| | 7 | 50 | 1574 | 106.4 |

*Weight of the one-day old chicks.

Examples of oral and parenteral pharmaceutical compositions and animal fodder preparations are given below.

Oral Composition

| a) | For young pigs: | | |
|---|---|---|---|
| | Paraffin (liquid) | 89.30 g | and |
| | Silicon dioxide (with hydrophobic properties) | 2.20 g | | are mixed with 4.95 g of the compound of Example 2.

| b) | For cattle: | | |
|---|---|---|---|
| | Polyethylene glycol (molecular weight above 9000) | 1.05 g | and |
| | Polyethylene glycol (molecular weight 190–200) | 103.95 g | | are mixed with 10 g of the compound of Example 2.

Parenteral Composition

| Polyethylene glycol (molecular weight 190 – 200) | 109.15 g | and |
|---|---|---|
| Polyethylene glycol (molecular weight above 9000) | 1.10 g | | are mixed with 110.25 g of a dispersing agent (e.g. Na-lauryl-sulfate) and with 10.50 g of the compound of Example 2.

Animal Fodder

An animal fodder is prepared of 55.5 % crushed, Indian corn; 22 % Soya flour; 10 % fish flour; 7 % shedded wheat; 3.30 % Tapioka flour; 1.25 % Soya oil; 0.25 % calcium carbonate; 0.20 % calcium phosphate; and 0.50 % of a usual mixture of trace elements are mixed and 20 ppm of the compound of Example 2 are added.

What is claimed is:

1. An animal fodder which comprises a growth promoting amount of a compound of the formula:

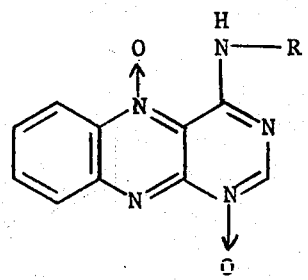

wherein
R is hydrogen, straight or branched chain alkyl of 1 to 6 carbon atoms, or cycloalkyl of 5 to 7 carbon atoms or said alkyl or said cycloalkyl substituted by one or more identical or different moieties selected from the group consisting of hydroxy and alkoxy of 1 to 4 carbon atoms admixed with animal fodder.

2. An animal fodder according to claim 1 wherein said alkyl is of 1 to 4 carbon atoms and said cycloalkyl is of 5 or 6 carbon atoms.

3. An animal fodder according to claim 1, wherein R is hydrogen, methyl, ethyl, n-propyl, iso-propyl, butyl, cyclohexyl or β-hydroxy-ethyl.

4. An animal fodder according to claim 1, wherein R is hydrogen, straight or branched chain alkyl of 1 to 4 carbon atoms, hydroxyl substituted straight or branched chain alkyl of 1 to 4 carbon atoms, or cyclohexyl.

5. An animal fodder according to claim 1, wherein said compound is

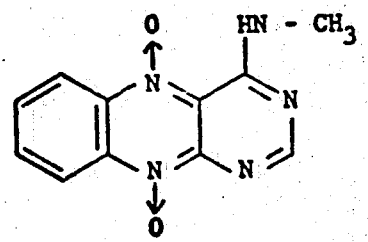

6. An animal fodder according to claim 1, wherein said compound is

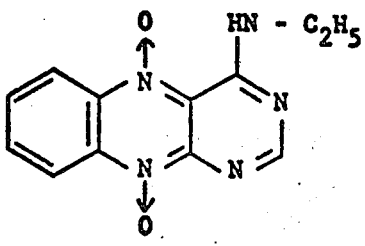

7. An animal fodder according to claim 1, wherein said compound is

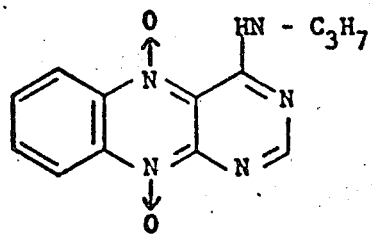

8. An animal fodder according to claim 1, wherein said compound is

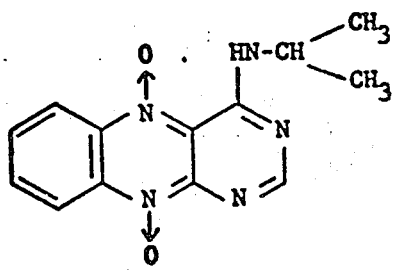

9. An animal fodder according to claim 1, wherein said compound is

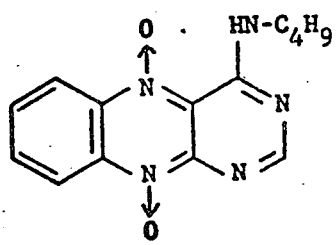

10. An animal fodder according to claim 1, wherein said compound is

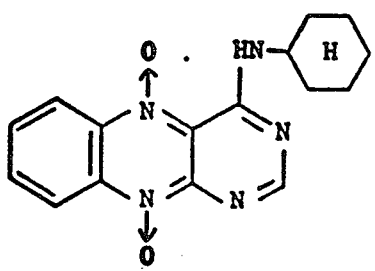

11. An animal fodder according to claim 1, wherein said compound is

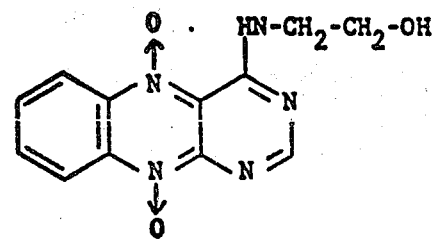

12. An animal fodder according to claim 1, wherein said compound is

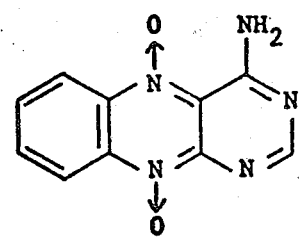

13. A method of increasing growth in animals which comprises administering to an animal a growth-promoting amount of the animal fodder of claim 1.

14. A method according to claim 13 wherein said alkyl is of 1 to 4 carbon atoms and said cycloalkyl is of 5 or 6 carbon atoms.

15. A method according to claim 13, wherein R is hydrogen, methyl, ethyl, n-propyl, iso-propyl, butyl, cyclohexyl of β-hydroxy-ethyl.

16. A method according to claim 13, wherein R is hydrogen, straight or branched chain alkyl of 1 to 4 carbon atoms, hydroxyl, substituted straight or branched chain alkyl of 1 to 4 carbon atoms, or cyclohexyl.

17. A method according to claim 13, wherein said compound is

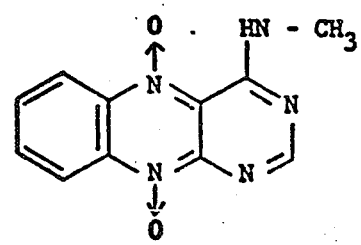

18. A method according to claim 13, wherein said compound is

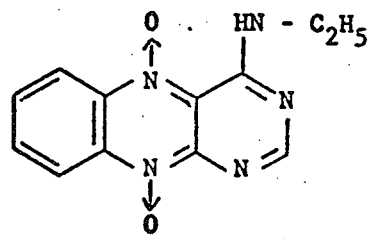

19. A method according to claim 13, wherein said compound is
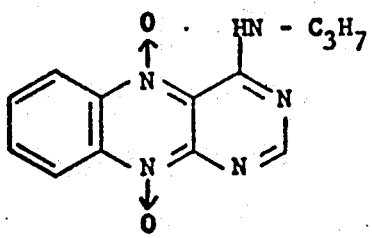
20. A method according to claim 13, wherein said compound is
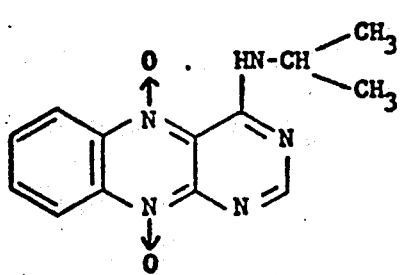
21. A method according to claim 13, wherein said compound is
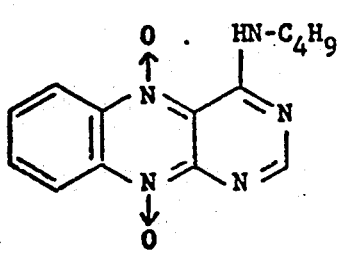
22. A method according to claim 13, wherein said compound is
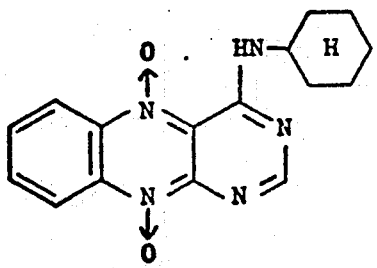
23. A method according to claim 13, wherein said compound is
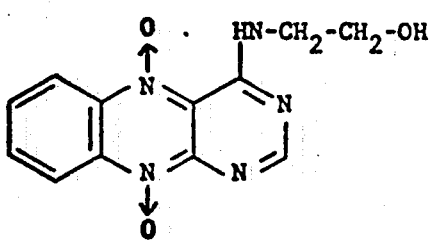
24. A method according to claim 13, wherein said compound is
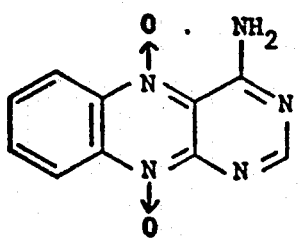
* * * * *